(12) United States Patent
Nagai et al.

(10) Patent No.: US 6,567,243 B2
(45) Date of Patent: May 20, 2003

(54) RECORDING AND REPRODUCING APPARATUS AND RECORDING AND REPRODUCING METHOD

(75) Inventors: Nobuyuki Nagai, Kanagawa (JP); Tadashi Ozue, Kanagawa (JP)

(73) Assignee: Sony Corporation, Tokyo (JP)

( * ) Notice: Subject to any disclaimer, the term of this patent is extended or adjusted under 35 U.S.C. 154(b) by 135 days.

(21) Appl. No.: 09/780,796

(22) Filed: Feb. 9, 2001

(65) Prior Publication Data

US 2001/0013996 A1 Aug. 16, 2001

(30) Foreign Application Priority Data

Feb. 10, 2000 (JP) ......................................... 2000-038240

(51) Int. Cl.$^7$ ............................................... G11B 21/04
(52) U.S. Cl. ................................................. 360/271.5
(58) Field of Search .......................... 360/271.4, 271.5, 360/271.6, 77.15, 77.14, 78.06, 78.07, 22, 27, 64, 135, 128; 369/289, 283, 290; 386/122

(56) References Cited

U.S. PATENT DOCUMENTS

| | | | | | |
|---|---|---|---|---|---|
| 4,791,507 A | * | 12/1988 | Doyama et al. | ......... | 360/77.15 |
| 5,392,174 A | * | 2/1995 | Suzuki | ..................... | 360/78.06 |
| 5,398,138 A | * | 3/1995 | Tomita | ......................... | 360/22 |
| 5,537,277 A | * | 7/1996 | Kato | .......................... | 360/121 |
| 5,590,009 A | * | 12/1996 | Ishida | ......................... | 360/135 |
| 5,739,973 A | * | 4/1998 | Echigo | ..................... | 360/77.15 |
| 5,825,971 A | * | 10/1998 | Inoue et al. | ................... | 360/64 |

* cited by examiner

Primary Examiner—Allen Cao
(74) Attorney, Agent, or Firm—Sonnenschein, Nath & Rosenthal

(57) ABSTRACT

A helical-scan system performs recording and reproduction on a magnetic tape by using a recording and reproducing head 5 comprising m magnetic head elements 7 (where m is 2 or larger integer). During this recording and reproduction, the following relationships are satisfied among a track width W for each of the head elements 7, a track pitch Tp between the head elements 7, and a feed amount S for a magnetic tape 6.

$nW/2 < Tp < 2mW$ $nTp - W < S < nTp + W$ (where n is an integer)

5 Claims, 6 Drawing Sheets

RECORDING AND REPRODUCING APPARATUS AND RECORDING AND REPRODUCING METHOD

RELATED APPLICATION DATA

This application claims priority to Japanese Patent Application No. 2000-038240, filed Feb. 10, 2000.

BACKGROUND OF THE INVENTION

1. Technical Field

The present invention relates to a recording and reproducing apparatus and a recording and reproducing method using helical-scan technology for recording and/or reproducing data on magnetic storage media.

2. Prior Art

In the field of magnetic recording, there is an increasing demand for recording and reproducing a large amount of high-quality voice and video signals. An amount of information to be handled increases drastically. Further, a high transfer rate is required. A so-called helical-scan system is proposed and is put to practical use as a recording and reproducing system for providing a large-size storage capacity and a high-speed transfer rate.

The helical-scan system is used for, say, a video tape recorder (VTR), a digital audio tape (DAT), and the like. The helical-scan system comprises a magnetic head on a fast rotating drum. By moving the tape around this drum, the helical-scan system fast records or reproduces data diagonally across the magnetic tape.

In recent years, however, there is an increasing demand for an improved recording density due to a further increasing amount of information to be processed and from the viewpoint of needs for a small-size and large-capacity recording and reproducing apparatus. Narrowing a track pitch is one technique for improving the recording density.

With a conventional helical-scan system, however, narrowing a track pitch makes it difficult to stably and accurately perform recording and reproduction.

Track pitches rather greatly fluctuate due to minute errors at respective parts for each recording and reproducing apparatus. These errors are specifically caused by irregularities in magnetic head shapes during manufacturing, installation positions of magnetic heads on the rotary drum, rotational speeds of the rotary drum, and tape tensions applied to the magnetic tape.

There may be the case where the track pitch is designed to be a very small value such as several microns for a recording and reproducing apparatus using the helical-scan system. In this case, the above-mentioned minute errors at respective parts cause a track pitch error which is not negligible. This makes a normal recording and reproducing operation difficult.

Further, in recent years, there is an increasing demand for a much higher transfer rate in order to fast process a large amount of information.

However, for example, the conventional helical-scan system implements a high transfer rate by increasing the number of magnetic heads on a rotary head. Irregularities in magnetic head shapes or installation positions greatly affect the track pitch accuracy for each magnetic head, causing a problem of increasing track pitch unevenness.

BRIEF SUMMARY OF THE INVENTION

To solve the above-mentioned problems, it is therefore an object of the present invention to provide a recording and reproducing apparatus and a recording and reproducing method for achieving a high recording density and a high transfer rate, and stably and accurately performing recording and reproduction.

A recording and reproducing apparatus comprises a rotary drum provided with at least one recording and reproducing head having m head elements (where m is 2 or larger integer) for recording and/or reproducing a magnetic signal on a magnetic recording medium; and a feed mechanism for wrapping a magnetic recording medium halfway around the rotary drum and feeding this magnetic recording medium at a specified feed speed. The following relationships expressed in equations 1 and 2 are satisfied among a track width W for each of the head elements, a track pitch Tp between the head elements, and a feed amount S for a magnetic tape medium fed by the tape feed mechanism until the recording and reproducing head scans the magnetic recording medium next.

$$mW/2 < Tp < 2mW \quad \text{Equation 1}$$

$$nTp - W < S < nTp + W \text{ (where n is an integer)} \quad \text{Equation 2}$$

The thus configured recording and reproducing apparatus can perform recording and reproduction on a plurality of recording tracks at a time using a plurality of head elements while the recording and reproducing head scans a magnetic recording medium.

A recording and reproducing method according to the present invention performs helical-scan recording and/or reproduction for a magnetic recording medium by using a recording and reproducing apparatus comprising a rotary drum provided with at least one recording and reproducing head. The following relationship in equation 3 is satisfied when the recording and reproducing head uses a magnetic head comprising m head elements (where m is 2 or larger integer) with each track width W and a track pitch Tp between the head elements. The following relationship in equation 4 is satisfied with respect to a feed amount S for a magnetic recording medium to be fed until the recording and reproducing head scans the magnetic recording medium next.

$$mW/2 < Tp < 2mW \quad \text{Equation 3}$$

$$nTp - W < S < nTp + W \text{ (where n is an integer)} \quad \text{Equation 4}$$

The above-mentioned recording and reproducing method can perform recording and reproduction on a plurality of recording tracks at a time using a plurality of head elements while the recording and reproducing head scans a magnetic recording medium.

As mentioned above, the recording and reproducing apparatus and the recording and reproducing method according to the present invention can perform recording and reproduction on a plurality of recording tracks at a time using a plurality of head elements while the recording and reproducing head scans a magnetic recording medium. Namely, a plurality of head elements mounted on the recording and reproducing head are used for concurrent recording and reproduction on a plurality of recording tracks. This configuration prevents track pitch errors from increasing due to accumulated installation errors for each head element. If a track pitch is narrowed for increasing the recording density, it is possible to stably and accurately perform recording and reproduction. Further, recording and reproduction is performed on a plurality of recording tracks at a time, making it possible to increasing a transfer rate.

DETAILED DESCRIPTION OF THE INVENTION

Embodiments of the present invention will be described in further detail with reference to the accompanying drawings. The present invention is applicable to a recording and reproducing apparatus which uses magnetic tape as a magnetic recording medium and performs recording and/or reproduction (hereafter referred to as recording and reproduction) by using a helical-scan system. For example, the present invention can be used for a video tape recorder, an audio tape recorder, a data storage system as a computer storage device, and the like.

Figure 1:
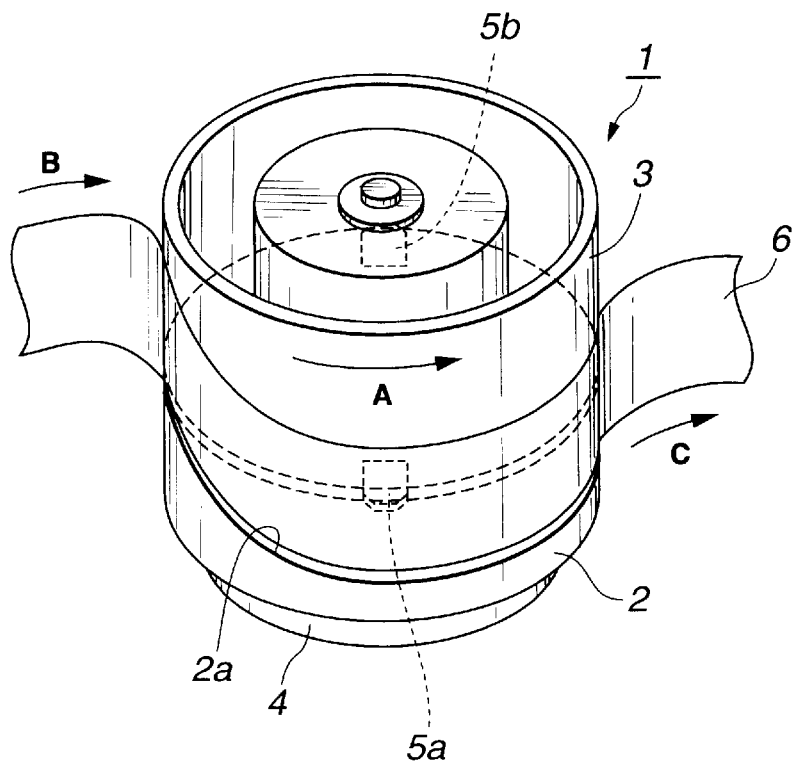
FIG. 1 is a perspective view showing an example of a rotary drum used for a recording and reproducing apparatus according to the present invention.

First, the following describes a rotary drum 1 in FIG. 1 as a configuration example of a rotary drum used for a recording and reproducing apparatus according to the present invention. FIG. 1 is a perspective view schematically showing the rotary drum 1.

The rotary drum 1 comprises a cylindrical stationary drum subassembly 2, a cylindrical rotary drum subassembly 3, a motor 4 for rotatively driving the cylindrical rotary drum subassembly 3, and a pair of recording and reproducing heads 5a and 5b mounted on the cylindrical rotary drum subassembly 3.

The stationary drum subassembly 2 fixedly mounted with reference to the recording and reproducing apparatus. On the side of the stationary drum subassembly 2, there is formed a lead guide 2a along a running direction of a magnetic tape 6. As will be described later, the rotary drum 1 runs the magnetic tape 6 along the lead guide 2a during recording and reproduction.

The rotary drum subassembly 3 is rotatively driven by the motor 4 at a specified rotational speed. The rotary drum subassembly 3 is cylindrically shaped with almost the same diameter as the stationary drum subassembly 2 and is arranged concentrically with the stationary drum subassembly 2.

The recording and reproducing heads 5a and 5b are provided on a side of the rotary drum subassembly 3 opposite the stationary drum subassembly 2 and are rotatively driven together with the rotary drum subassembly 3. A pair of recording and reproducing heads 5a and 5b forms an angle of 180° with reference to the rotary drum subassembly 3's center. The heads 5a and 5b are provided so that their surfaces for recording and reproduction on the magnetic tape 6 protrude from an outer periphery of the rotary drum subassembly 3.

Figure 2:
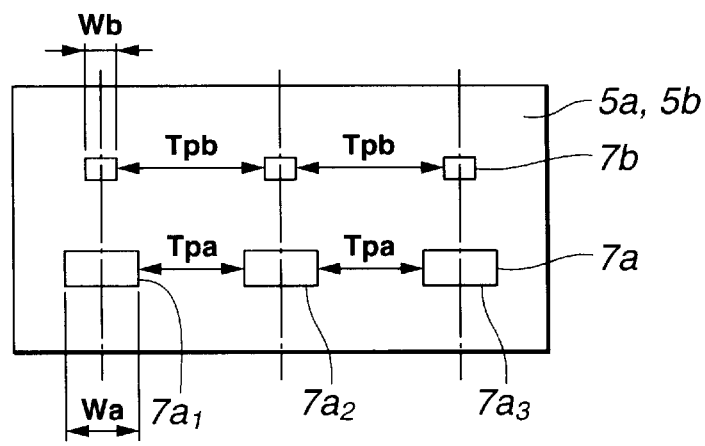
FIG. 2 is a top view showing an example of a media contact surface of a recording and reproducing head mounted on the same rotary drum.
Figure 3:
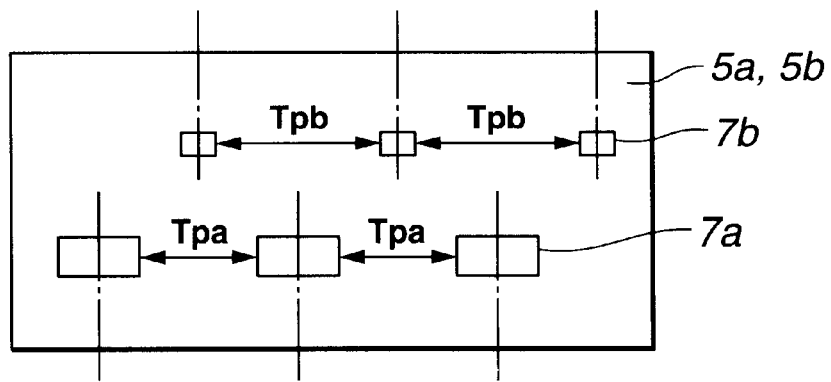
FIG. 3 is a top view showing another example of a media contact surface of a recording and reproducing head mounted on the same rotary drum.

As shown in FIG. 2, the recording and reproducing heads 5a and 5b (hereafter generically referred to as a recording and reproducing head 5) are provided with a plurality of magnetic head elements 7a and 7b, respectively. FIG. 2 is an enlarged top view showing the recording and reproducing head 5's face opposite the magnetic tape 6, namely the face for performing recording and reproduction. In this embodiment, as shown in FIG. 2, the recording and reproducing heads 5a and 5b each are provided with three sets of the magnetic head elements 7a and 7b.

Here, the magnetic head element 7a is a so-called inductive magnetic head comprising a coil wound around a magnetic core with a magnetic gap. The magnetic head element 7a functions as a recording magnetic head for recording magnetic signals on the magnetic tape 6.

The magnetic head element 7b is a so-called MR magnetic head comprising a magnetoresistance (MR) element as a magnetosensitive element for detecting magnetic signals recorded on the magnetic tape 6. The magnetic head element 7b functions as a reproducing magnetic head for detecting magnetic signals recorded on the magnetic tape 6.

Generally, an MR magnetic head excels in resolutions toward a linear density. The recording and reproducing apparatus according to the present invention uses the MR-type magnetic head element 7b as a reproducing magnetic head. As will be described later in greater detail, a plurality of magnetic head elements 7a and 7b perform recording and reproduction concurrently. This can improve recording densities not only toward the track width, but also toward the linear density, thus providing a much higher recording density.

On the recording and reproducing head 5, the magnetic head elements 7a and 7b are aligned to each other on their centers and are provided as a set. In FIG. 2, $W_a$ and $W_b$ indicate track widths of the magnetic head elements 7a and 7b, respectively. Further in FIG. 2, $Tp_a$ and $Tp_b$ indicate track pitches, namely intervals along the track widths for each set of magnetic head elements 7a and 7b, respectively.

Here, it is desirable to keep 5 μm or more for the track pitches $Tp_a$ and $Tp_b$ for each of the magnetic head elements 7a and 7b. This can prevent the magnetic head elements 7a and 7b from contacting with each other.

On the above-mentioned recording and reproducing heads 5a and 5b, it is desirable to set different azimuth angles for the adjacent magnetic head elements 7a and 7b in the sets of these magnetic head elements. During recording and reproduction, it is possible to prevent a crosstalk generated by recording and reproducing a magnetic signal from a recording track for each adjacent magnetic head elements 7a and 7b. This will be described later in detail. Accordingly, stable and accurate recording and reproduction is available even if narrowing an interval between recording tracks for further increasing the high recording density.

Each of the magnetic head elements 7a and 7b is preferably a thin-film magnetic head manufactured by the thin-film formation technology. This can precisely form the above-mentioned track pitches $Tp_a$ and $Tp_b$ and track widths $W_a$ and $W_b$, accurately record and reproduce finer magnetic signals, and provide stable recording and reproduction in response to an increasing demand for a higher recording density.

In the following description, the rotary drum 1 is provided with a pair of recording and reproducing heads 5a and 5b. These heads are used for alternate recording and reproduction on the magnetic recording medium 6. The present invention is not limited to the rotary drum 1 comprising a plurality of recording and reproducing heads 5. It may be preferable to perform recording and reproduction by using just one recording and reproducing head 5. The recording and reproducing apparatus can be designed to have a plurality of recording and reproducing heads 5 for orderly performing recording and reproduction. The thus configured recording and reproducing apparatus can increase the recording density and the transfer rate even when the magnetic tape 6's feed speed is lowered. On the other hand, however, this configuration requires finely aligning each recording and reproducing head 5. It may be preferable to determine the number of recording and reproducing heads 5 to be mounted on the rotary drum 1 according to an intended recording and reproducing.

Figure 4:
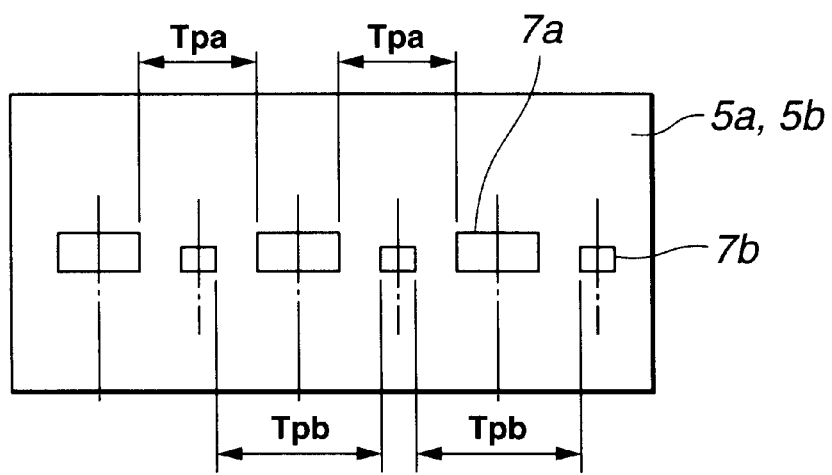
FIG. 4 is a top view showing yet another example of a media contact surface of a recording and reproducing head mounted on the same rotary drum.
Figure 8:
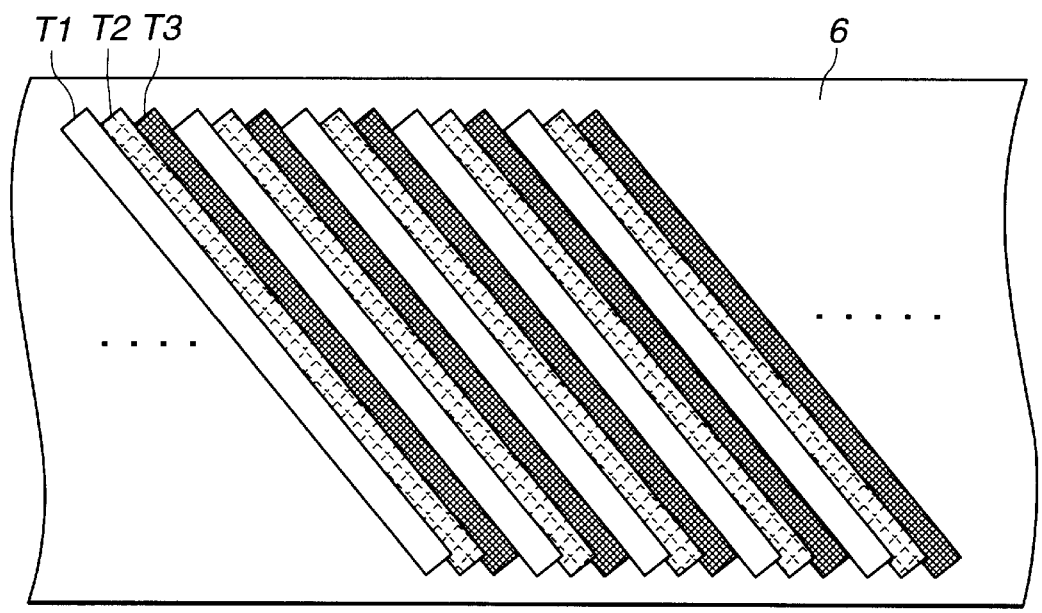
FIG. 8 is a schematic diagram illustrating recording tracks finally formed on magnetic tape by means of the same recording and reproducing apparatus.

In the above description, as shown in FIG. 2, the magnetic head elements 7a and 7b are aligned to each other on their centers and are provided as a set. As shown in FIG. 8, for example, it may be preferable to provide the magnetic head elements 7a and 7b with a specified displacement between them. Further, as shown in FIG. 4, it may be preferable to provide the magnetic head elements 7a and 7b alternately along a line. However, it is important to keep the same interval between magnetic head elements 7a and between magnetic head elements 7b.

In this embodiment, the recording and reproducing heads 5a and 5b are separately provided with the magnetic head element 7a as a recording magnetic head and the magnetic head element 7b as a reproducing magnetic head, respectively. For example, it may be preferable to use an inductive magnetic head element 7a for recording and reproduction on magnetic tape without using the magnetic head element 7b.

Figure 5:
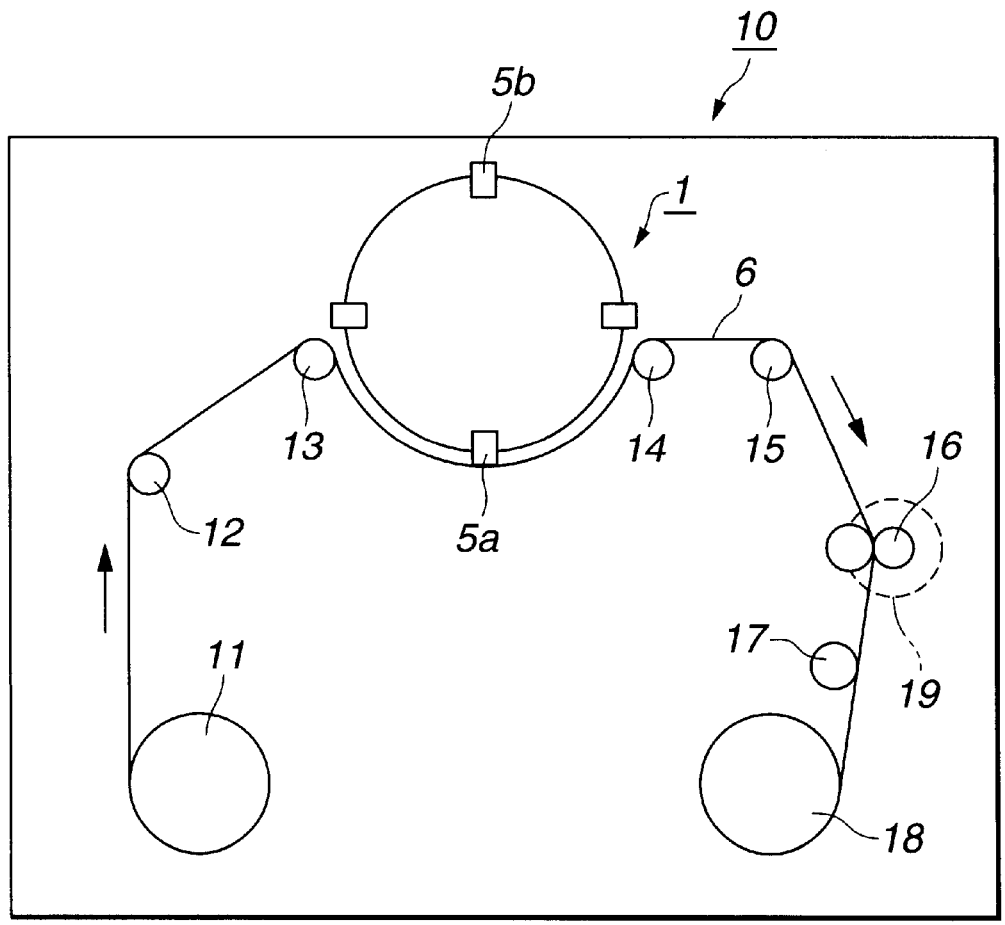
FIG. 5 is a top view showing an example of a tape feed mechanism used for a recording and reproducing apparatus according to the present invention.

In the recording and reproducing apparatus according to the present invention, the magnetic tape 6 is wrapped halfway around the thus configured rotary drum 1. A tape feed mechanism 10 as shown in FIG. 5 is used for feeding the magnetic tape 6 at a specified speed. The recording and reproducing heads 5a and 5b are moved across the magnetic tape 6 to record and reproduce magnetic signals.

In the recording and reproducing apparatus according to the present invention, as shown in FIG. 5, the magnetic tape 6 is fed from a supply reel 11 through guide rollers 12 and 13 so that the magnetic tape is wrapped halfway around the rotary drum 1. The rotary drum 1 is used for recording and reproduction on the magnetic tape. The magnetic tape 6 thus processed by the rotary drum 1 is then fed to a takeup roll 18 through guide rollers 14 and 15, a capstan 16, and a guide roller 17. The capstan 16 is rotatively driven by a capstan motor 19 and feeds the magnetic tape 6 by applying a specified tension to it.

At this time, the motor 4 rotatively drives the rotary drum subassembly 3 of the rotary drum 1 in the direction of the arrow A in FIG. 1. The magnetic tape 6 moves along the lead guide 2a formed on the stationary drum subassembly 2 and is fed diagonally with reference to the stationary drum subassembly 2 and the rotary drum subassembly 3. Namely, the magnetic tape 6 is fed from a tape entry side as indicated with the arrow B in FIG. 1. The tape runs along the lead guide 2a in contact with the stationary drum subassembly 2 and the rotary drum subassembly 3. The tape is then fed to a tape exit side as indicated with the arrow C in FIG. 1.

The following describes recording and reproduction operations of the recording and reproducing apparatus comprising the rotary drum 1 and the tape feed mechanism 10 as mentioned above with reference to FIG. 6 showing peripheral circuitry of this recording and reproducing apparatus.

Figure 6:
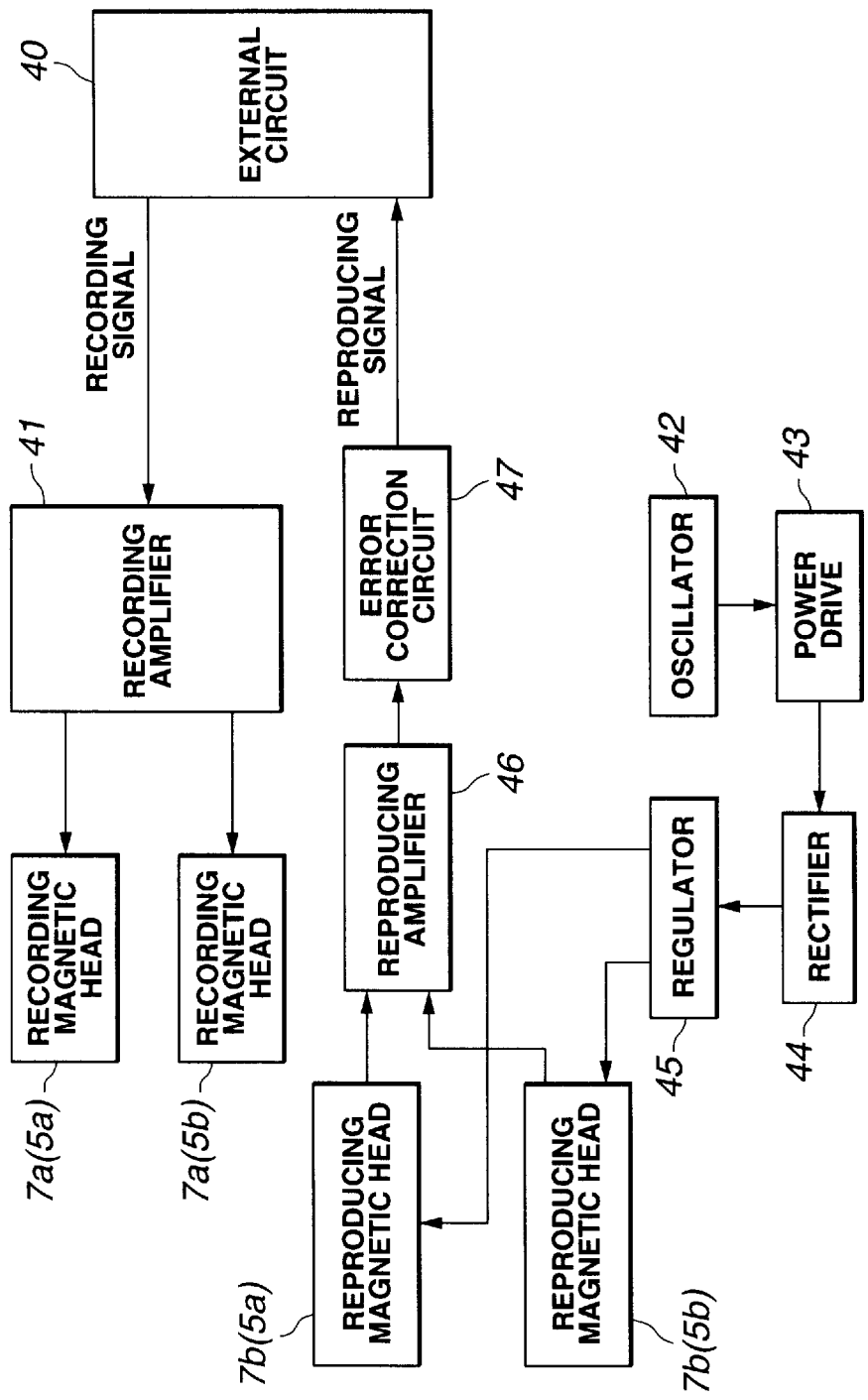
FIG. 6 is a circuit diagram showing peripheral circuitry of the same recording and reproducing apparatus.

When the rotary drum 1 and the tape feed mechanism 10 are used for recording magnetic signals on the magnetic tape 6, an electric current is supplied to a drive coil of the motor 4 to drive the rotary drum subassembly 3 at a specified rotational speed. While the rotary drum subassembly 3 is rotating, a recording signal from the external circuit 40 is supplied to the recording amplifier 41 as shown in FIG. 6.

The recording amplifier 41 amplifies a recording signal output from the external circuit 40. Either of a pair of recording and reproducing heads 5a and 5b, say, the recording and reproducing head 5a is used for recording a magnetic signal. At this time, the magnetic head element 7a on this recording and reproducing head 5a is supplied with a recording signal corresponding to a magnetic signal to be recorded. When the other recording and reproducing head 5b is used for recording, the magnetic head element 7a on this recording and reproducing head 5b is supplied with a recording signal corresponding to a magnetic signal to be recorded.

As mentioned above, a pair of recording and reproducing heads 5a and 5b is arranged to form an angle of 180° with reference to the center of the rotary drum subassembly 3. These recording and reproducing heads 5a and 5b alternately record signals with a phase difference of 180°. Using the 180° phase difference, the recording amplifier 41 switches timing for supplying recording signals to the recording and reproducing heads 5a and 5b alternately.

As mentioned above, the recording and reproducing apparatus according to the present invention uses a plurality of magnetic head elements 7a provided on respective recording and reproducing heads 5a and 5b for concurrently recording signals on a plurality of recording tracks. The recording amplifier 41 supplies a plurality of these magnetic head elements 7a with recording signals corresponding to magnetic signals to be recorded by these magnetic head elements. FIG. 6 presents one magnetic head element 7a for recording and reproducing heads 5a and 5b each, omitting an illustration of a plurality of magnetic head elements 7a.

When reproducing the magnetic signal recorded on the magnetic tape 6 by using the rotary drum 1 and the tape feed mechanism 10, the motor 4's drive coil is supplied with electric current to drive the rotary drum subassembly 3 at a specified rotational speed. While the rotary drum subassembly 3 is rotating, the power drive 43 is supplied with a high-frequency current from the oscillator 42 as shown in FIG. 6.

The power drive 43 converts the high-frequency current supplied from the oscillator 42 to a specified alternating current and supplies it to the rectifier 44. The rectifier 44 rectifies the alternating current supplied from the power drive 43 to generate a direct current and supplies it to the regulator 45. The regulator 45 amplifies the direct current supplied from the rectifier 44 to a specified voltage and supplies it as a sense current to the magnetic head element 7b for the recording and reproducing heads 5a and 5b. The magnetic head element 7b is supplied with a sense current from the regulator 45. In addition, the magnetic head element 7b outputs a resistance change to the reproducing amplifier 46 as a voltage change in the reproducing signal. A resistance value varies with a magnetic signal recorded on the magnetic tape 6.

Either of a pair of recording and reproducing heads 5a and 5b, say, the recording and reproducing head 5a reproduces a magnetic signal. At this time, the reproducing amplifier 46 amplifies a reproducing signal output from the magnetic head element 7b provided on the recording and reproducing head 5a and outputs it to an error correction circuit 47. When the other recording and reproducing head 5b is used for reproduction, the reproducing amplifier 46 amplifies a reproducing signal output from the magnetic head element 7b provided on the recording and reproducing head 5b and outputs it to the error correction circuit 47.

Like recording, a pair of recording and reproducing heads 5a and 5b alternately reproduces signals with a phase difference of 180°. Namely, using the 180° phase difference, the reproducing amplifier 46 switches timing for outputting reproducing signals to the recording and reproducing heads 5a and 5b alternately.

As mentioned above, the recording and reproducing apparatus according to the present invention uses a plurality of magnetic head elements 7b provided on respective recording and reproducing heads 5a and 5b for concurrently reproducing signals on a plurality of recording tracks. The reproducing amplifier 46 respectively amplifies reproducing signals output from a plurality of these magnetic head elements 7b and outputs the reproducing signals to the error correction circuit 47. FIG. 6 presents one magnetic head element 7b for recording and reproducing heads 5a and 5b each, omitting an illustration of a plurality of magnetic head elements 7b.

The error correction circuit 47 performs error-correction for a reproducing signal output from the reproducing amplifier 46 and output this signal to the external circuit 40.

The following describes recording tracks formed on the magnetic tape 6 when the recording and reproducing apparatus according to the present invention performs recording and reproduction on the magnetic tape 6 as mentioned above.

As mentioned above, the recording and reproducing apparatus according to the present invention is designed to use the recording and reproducing head 5 comprising a plurality of magnetic head elements 7a and 7b for recording and reproduction so that the following conditions are satisfied. Namely, under the condition that W is assumed to be a track width for each of the magnetic head elements 7a and 7b, the following equations 5 and 6 specify the relationship among track pitches $Tp_a$ and $Tp_b$ for the magnetic head elements 7a and 7b respectively, and a feed amount S for the magnetic tape 6 fed by the tape feed mechanism 10 until the recording and reproducing head 5 scans the magnetic recording medium next.

$$mW/2 < Tp < 2mW \qquad \text{Equation 5}$$

$$nTp - W < S < nTp + W \text{ (where n is an integer)} \qquad \text{Equation 6}$$

In equation 5, m indicates the number of sets of magnetic head elements 7a and 7b provided on the recording and reproducing head 5. In this embodiment, m is set to 3. When the inductive magnetic head element 7a is used for recording and reproduction instead of the magnetic head element 7b, m in equation 5 indicates the number of magnetic head elements 7a on each recording and reproducing head 5.

When the magnetic head elements 7a and 7b use different track widths Wa and Wb, the track width W in equations 5 and 6 should be set to $W_a$ or $W_b$ whichever is narrower.

When the magnetic head elements 7a and 7b use different track pitches $Tp_a$ and $Tp_b$, the track pitch Tp in equations 5 and 6 should be set to $Tp_a$ or $Tp_b$ whichever is wider.

When the rotary drum 1 is provided with a plurality of recording and reproducing heads 5 as explained in this embodiment of the present invention, the feed amount S for the magnetic tape 6 should be an amount of the magnetic tape 6 to be fed after the specific recording and reproducing head 5a performs recording and reproduction on the magnetic tape 6 until the next recording and reproducing head 5b performs recording and reproduction. When the rotary drum 1 is provided with the single recording and reproducing head 5, for example, the feed amount S should be an amount of the magnetic tape 6 to be fed after this recording and reproducing head 5 performs recording and reproduction on the magnetic tape 6 until this recording and reproducing head 5 performs next recording and reproduction.

Figure 7:
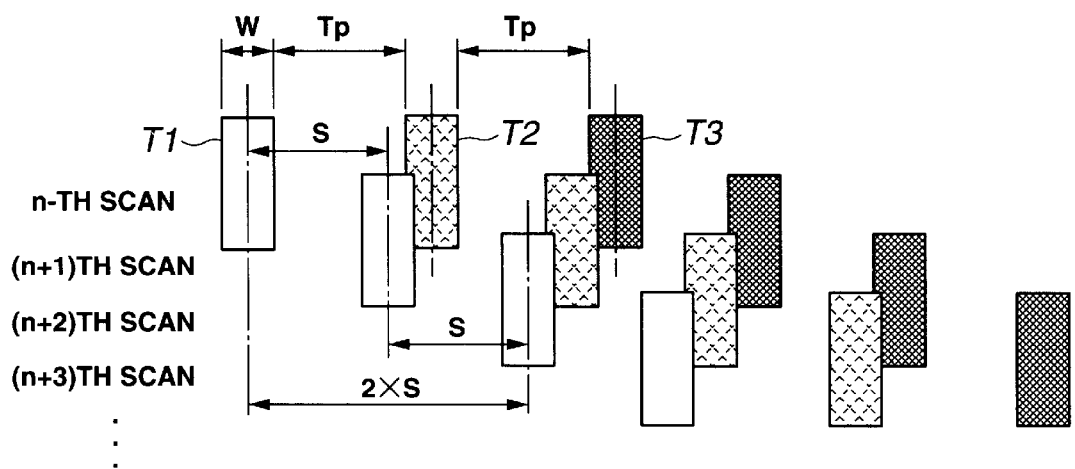
FIG. 7 is a schematic diagram illustrating recording tracks formed on magnetic tape by means of the same recording and reproducing apparatus.

With reference to FIG. 7, the following describes recording tracks formed on the magnetic tape 6 when a recording operation is performed by satisfying the above-mentioned equations 5 and 6.

The following describes a recording operation using just the magnetic head element 7a out of the magnetic head elements 7a and 7b mounted on the recording and reproducing head 5. The same applies to a reproduction operation using the magnetic head element 7b. The following description assumes three magnetic head elements 7a in FIG. 2. These elements are referred to as a rear head $7_{a1}$, an intermediate head $7_{a2}$, and a front head $7_{a3}$ for convenience's sake corresponding to the positions of these head elements arranged in the scanning direction of the magnetic tape 6.

When the recording and reproducing apparatus according to the present invention records a magnetic signal on the magnetic tape 6, the magnetic head element 7a forms recording tracks at positions as shown in FIG. 7 on the magnetic tape 6. When the recording and reproducing head 5 performs a recording operation on the magnetic tape 6 by means of the nth scanning, the rear head $7_{a1}$, the intermediate head $7_{a2}$, and the front head $7_{a3}$ form recording tracks T1, T2, and T3 respectively with the track width W each and a track pitch Tp between them.

When the recording and reproducing head 5 performs a recording operation on the magnetic tape 6 by means of the (n+1)th scanning, recording tracks T1, T2, and T3 are similarly formed with the feed amount S displaced from the recording tracks T1, T2, and T3 formed at the nth scanning. Likewise, after the (n+2)th scanning, recording tracks T1, T2, and T3 are formed with the feed amount S multiplied by 2 displaced from the recording tracks T1, T2, and T3 formed at the nth scanning. After the (n+3)th scanning, recording tracks T1, T2, and T3 are formed with the feed amount S multiplied by 3 displaced from the recording tracks T1, T2, and T3 formed at the nth scanning.

Consequently, the recording track T1, T2, T3 are sequentially formed on the magnetic tape 6 as shown in FIG. 8.

Since the above-mentioned equation 5 is satisfied, the recording and reproducing apparatus according to the present invention can form subsequent recording tracks in gaps between the recording tracks so-far formed by respective magnetic head elements 7a. When the relationship of Tp=mW is satisfied, a gap between the recording tracks formed by the respective magnetic head elements 7a is just filled with a subsequently formed recording track. When the track pitch Tp is half mW (mW/2) or smaller, the formed recording track is overwritten with a subsequently formed recording track and cannot be read during reproduction. When the track pitch Tp is double mW (2mW/2) or larger, the recording tracks T1, T2, and T3 finally formed on the magnetic tape 6 in-between leave an interval larger than or equal to the track width W enough to further form a recording track. A high recording density cannot be provided.

Since the above-mentioned equation 6 is satisfied, the recording and reproducing apparatus according to the present invention can prevent the recording track formed on the magnetic tape 6 from being completely overwritten by a subsequently formed recording track. When the relationship of S=nTp is satisfied, a gap between the recording tracks formed by the respective magnetic head elements 7a is just filled with a subsequently formed recording track. When the feed amount S is nTp−W or smaller or is nTp+W or larger, the formed recording track is overwritten with a subsequently formed recording track and cannot be read during reproduction.

The recording and reproducing apparatus according to the present invention performs recording and reproduction as mentioned above. While the recording and reproducing head 5 scans the magnetic tape 6 once, a plurality of magnetic head elements 7a and 7b can concurrently perform recording and reproduction on a plurality of recording tracks. By contrast, a conventional recording and reproducing apparatus performs recording and reproduction on a single recording track by means of a single scan. Compared to such an apparatus, the recording and reproducing apparatus according to the present invention can record and reproduce a large amount of magnetic information at a time and further increase a high transfer rate.

A plurality of magnetic head elements 7a and 7b is provided as a set on the recording and reproducing head 5. By contrast, a conventional recording and reproducing apparatus uses a plurality of magnetic head elements separately provided on the rotary drum. Compared to such an apparatus, the recording and reproducing apparatus according to the present invention is free from a variation in recording track intervals due to accumulated installation errors and can provide a high recording density without precision alignment.

As is apparent from the description with reference to FIGS. 7 and 8, the rear head $7_{a1}$, the intermediate head $7_{a2}$, and the front head $7_{a3}$ are used for a sequential read operation to form the recording tracks T1, T2, and T3. When these recording tracks T1, T2, and T3 are to be partially overlapped by subsequently formed recording tracks T1, T2, and T3, the recording track T1 formed by the rear head $7_{a1}$ overwrites both ends of the recording tracks T2 and T3 formed by the intermediate head $7_{a2}$ and the front head $7_{a3}$. When the recording track is finally formed on the magnetic tape 6 as shown in FIG. 8, the recording track T1 formed by the rear head $7_{a1}$ determines each recording track width.

When the rear head $7_{a1}$'s track width is used as a reference track width W, it is desirable to keep track widths of the intermediate head $7_{a2}$ and the front head $7_{a3}$ slightly larger than the reference track width W. This prevents gaps between the finally formed recording tracks T1, T2, and T3 and provides a high recording density by fully using the magnetic tape 6's recording area. It is also possible to form the recording tracks T1, T2, and T3 finally with the same width as the reference track width W.

What is claimed is:

1. A recording and reproducing apparatus comprising:
    a rotary drum provided with at least one recording and reproducing head having m head elements (where m is an integer 2 or greater) for recording and/or reproducing a magnetic signal on a magnetic recording medium; and
    a feed mechanism for wrapping a magnetic recording medium halfway around said rotary drum and feeding this magnetic recording medium at a specified feed speed,
    wherein
        said head elements are thin-film magnetic heads manufactured by thin-film formation technology, and
        the following relationships are satisfied for a track width W for each of said head elements, a track pitch Tp between said head elements being 5 µm or more, and
        a feed amount S for a magnetic recording medium fed by said feed mechanism until said recording and reproducing head scans the magnetic recording medium:

$mW/2<Tp<2mW$ $nTp-W<S<nTp+W$ (where n is a positive non-zero integer).

2. The recording and reproducing apparatus according to claim 1, wherein, out of said head elements, a track width of a rearmost head element in the scanning direction of a magnetic recording medium is assumed to be a reference track width W and track widths of the other head elements are slightly greater than the reference track width W.

3. The recording and reproducing apparatus according to claim 1, wherein said recording and reproducing head uses different azimuth angles for said adjacent head elements.

4. The recording and reproducing apparatus according to claim 1, wherein said each head element comprises a magnetoresistance element for detecting a magnetic signal recorded on a magnetic recording medium.

5. A recording and reproducing method for performing helical-scan recording and/or reproduction for a magnetic recording medium by using a recording and reproducing apparatus comprising a rotary drum provided with at least one recording and reproducing head, wherein
    said recording and reproducing head uses a magnetic head comprising m head elements (where m is an integer 2 or greater) with each track width W and a track pitch Tp between said head elements being 5 µm or more and satisfying the following relationship:

$mW/2<Tp<2mW$, and the following relationship being satisfied with respect to a feed amount S for a magnetic recording medium to be fed until said recording and reproducing head scans said magnetic recording medium:

$nTp-W<S<nTp+W$ (where n is a positive non-zero integer), and wherein said head elements are thin-film magnetic heads manufactured by thin-film formation technology.

* * * * *